June 23, 1925.
S. ASATURIAN
DISCOUNT LUNCH AND PREMIUM CHECK
Filed Nov. 19, 1923
1,543,414
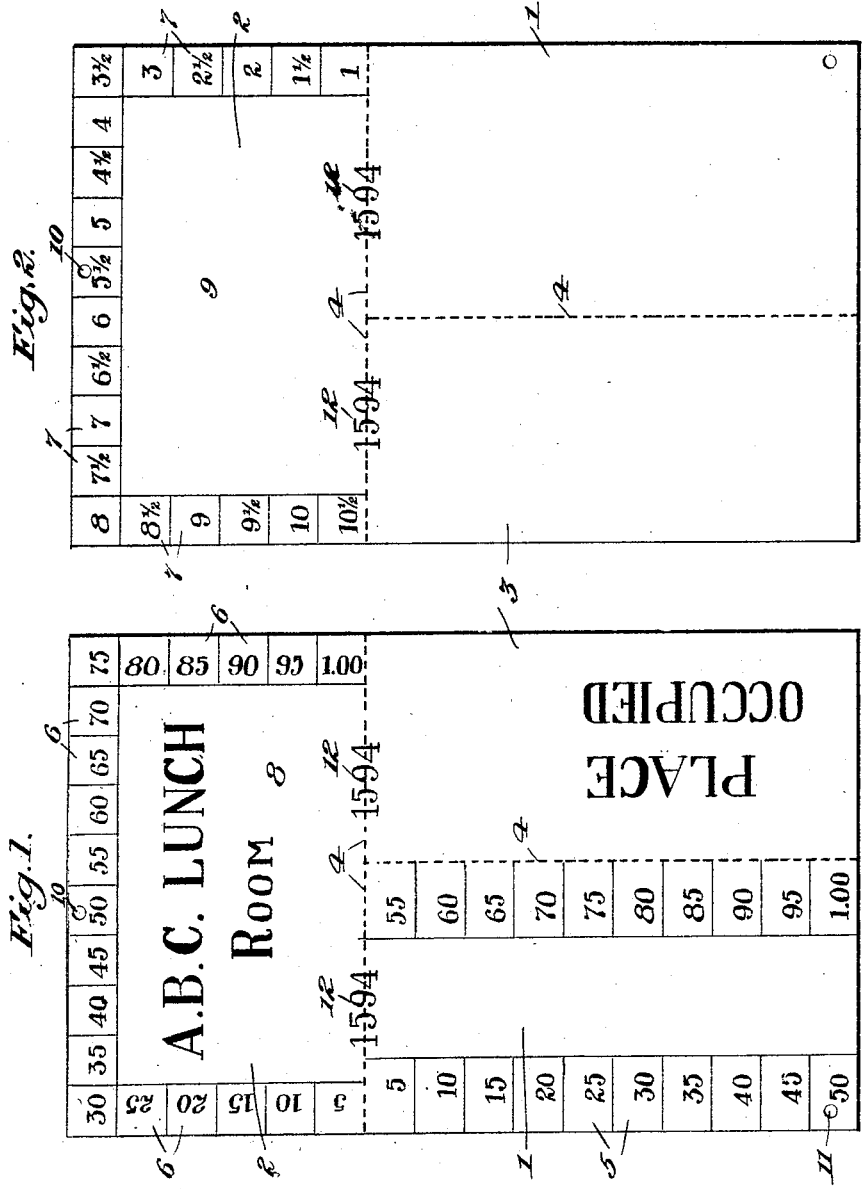
Inventor:
Setrak Asaturian,
By Frederick V. Winters,
Atty.

Patented June 23, 1925.

1,543,414

UNITED STATES PATENT OFFICE.

SETRAK ASATURIAN, OF BABYLON, NEW YORK.

DISCOUNT LUNCH AND PREMIUM CHECK.

Application filed November 19, 1923. Serial No. 675,668.

*To all whom it may concern:*

Be it known that I, SETRAK ASATURIAN, a citizen of the United States, residing at Babylon, in the county of Suffolk and State of New York, have invented certain new and useful Improvements in Discount Lunch and Premium Checks, of which the following is a full, clear, and exact specification.

This invention relates to checks for use in restaurants and lunch rooms, and has for its object to provide a check on which may be simultaneously indicated the amount of a purchase and the amount of a percentage discount corresponding to said purchase.

Another object is to provide a check comprising a plurality of separable parts or coupons, one of which may be retained by the restaurant at which the purchase is made, while another coupon may be given to the purchaser with the amount of his purchase and the corresponding discount indicated thereon, as above mentioned. The check to be retained by the restaurant may also have means for indicating the amount of the purchase thereon, so that the proprietor of said restaurant may have means for checking up the amount of each purchase against the amount indicated on the coupon given the purchaser and which the latter surrenders when he receives the discount indicated thereon. The check may also have a third detachable coupon bearing suitable indicia to permit it to be used for reserving a place at a table when the purchaser desires to leave temporary to secure additional food or for any other purpose.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a front or upper face view of a check made substantially in accordance with this invention, and Figure 2 is a reverse or back face view of said check.

As shown in the drawings, the check is composed of three coupons 1, 2 and 3, which may be separated from one another along the lines of perforation 4. The coupon 1 is designed to be retained by the restaurant, and it is preferably provided on its front or upper face with a series of progressive figures 5, any one of which may be punched for indicating the amount of the purchase. As shown, these figures run from 5 to 100 to indicate purchases of from 5¢ to $1.00, but other numbers or indicia may be employed if desired.

The coupon 2 has on its front or upper face a series of numbers 6 corresponding to those on the coupon 1, and when the amount of the purchase is punched on said coupon 1 it is also punched on the coupon 2. On the reverse or back face of the coupon 2 a series of percentage discount numbers 7 are indicated, each of said discount numbers being arranged immediately opposite the corresponding purchase number on the upper face of said coupon, so that when the amount of the purchase is punched on said coupon 2 the corresponding discount will be simultaneously punched on the back face of said coupon. Thus, if the amount of the purchase is 50¢ the punched hole 10 formed in the square containing the number "50" on the front of the coupon 2 will extend through the square containing the number "5½" on the back of said coupon, the latter number being the amount of the discount to which the purchaser is entitled. The amount of the purchase, 50¢, is also indicated by a punched hole 11 in the square containing the number "50" on the front face of the coupon 1.

As shown in the drawings, the purchase and discount numbers are arranged around the outer edges of the coupon 2, leaving a central space 8 on the upper face of said coupon on which the name of the restaurant or lunch room may be advantageously printed. The corresponding space 9 on the back face of the coupon 2 may be used for advertising purposes, as may also the back faces of the coupons 1 and 3.

The coupon 3 has on its front face the words "Place occupied" or a similar inscription which will enable the purchaser to leave said coupon at his place at table as a means of reserving his seat when he leaves it temporarily, as frequently occurs, especially in cafeterias or self-service lunch rooms when additional articles of food are desired.

The present form of lunch check is designed to stimulate business of merchants and others as well as the business of lunch room and restaurant proprietors. It is contemplated that a merchant, who is properly licensed under the patent which may be granted on this invention, will furnish the checks to the proprietor of a restaurant with whom he has made the necessary arrangements, said checks being printed with the name of the restaurant on the front and advertisements of the merchant on the back. One of the checks will then be given to each customer at the restaurant, and when the customer pays the amount of his purchase on leaving, he is given the coupon 2 showing the amount of his purchase and also the amount of the discount which is redeemable in merchandise at the merchant's establishment. The amount of the discount allowed the customer may be paid in whole or in part by the proprietor of the restaurant, or it may be paid entirely by the merchant as a means of stimulating his business. These details may be adjusted to suit the conditions in each case.

Each check may be serially numbered, as at 12, on the front face thereof, said numbers being preferably placed so as to overlap the lines of perforations running between the coupons, so that after the coupons have been separated, those belonging to the same check may be identified by fitting them together and completing the serial numbers thereof.

I claim:

1. A lunch check having a series of progressive indicia on one face for showing the amount of a purchase, and a series of progressive indicia on its other face for showing a percentage discount corresponding to the amount of the purchase, said discount indicia being arranged immediately opposite the corresponding indicia denoting the amount of the purchase, whereby the punching of the amount of the purchase on one face of the check will simultaneously punch the proper amount of the discount on the other face thereof.

2. A lunch check having two coupons, each having means for indicating the amount of a purchase thereon, one of said coupons also having means on its reverse face for indicating the amount of a percentage discount, said discount-indicating means being arranged directly opposite the means for indicating the amount of the purchase, whereby the punching of the amount of the purchase on one face of the coupon will simultaneously punch the proper discount on its other face thereof.

3. A lunch check having three separable coupons, one of said coupons bearing seat reserving indicia, and the other two coupons having means for indicating the amount of the purchase thereon, one of said latter coupons also having means for indicating a percentage discount to be allowed on said purchase.

In testimony whereof I have signed my name to this specification.

SETRAK ASATURIAN.